Feb. 16, 1932.   W. S. HANCOCK   1,845,597
LENS BRACKET
Filed Aug. 15, 1930
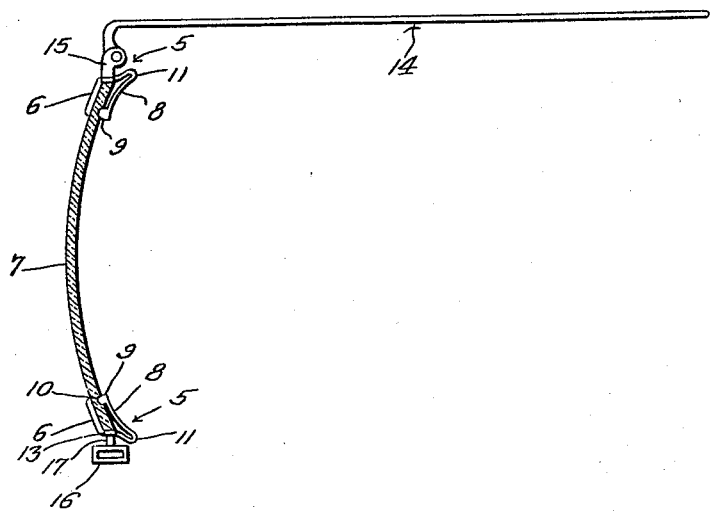
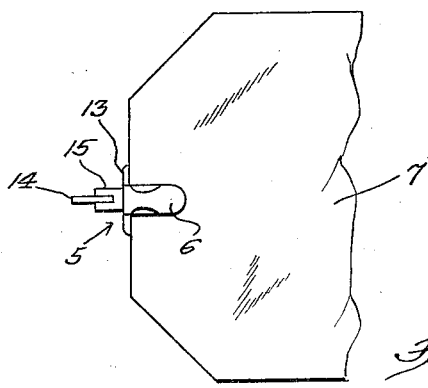
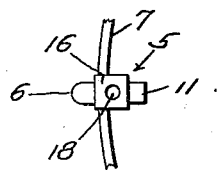
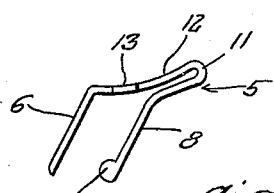
Inventor
Winfield S. Hancock,
BY *Clarence A. O'Brien*
Attorney Patented Feb. 16, 1932

1,845,597

UNITED STATES PATENT OFFICE

WINFIELD S. HANCOCK, OF INDEPENDENCE, KANSAS

LENS BRACKET

Application filed August 15, 1930. Serial No. 475,495.

This invention has reference to certain structural improvements and refinements embodied in the development of a pair of end brackets designed for use in association with rimless lenses, such as are employed in the construction of present-day types of eyeglasses and spectacles.

More specifically stated, the inventive conception depends for originality and novelty on the use of a pair of especially designed fixtures and brackets, for each lens, these being disposed at opposite points and intended for connecting the temples and nose bridge, in place in such a manner as to facilitate the assembly and repair of eyeglasses and spectacles.

A paramount feature of importance which distinguishes the present arrangement of prior art devices is the fact that the glass lens is not drilled with holes to accommodate the retaining bracket. Instead the inner surfaces of the lenses are merely formed with slight depressions functioning as keeper seats for cooperation with especially designed portions of the brackets.

In accordance with the invention I provide a pair of distinguishable brackets for each lens, and each bracket is characterized by features which are common or generic, inasmuch as each bracket is of general U-shaped configuration to form a clip, whose jaw portions straddle and releasably and yieldably grip the adjacent marginal portions of the lens and the outer bracket is constructed to facilitate attachment of the companion temples thereto, while the inner bracket is especially fashioned to facilitate connection of a suitable nose piece or grip thereto.

Other features and advantages will become more readily apparent from the following description and drawings.

In the drawings:

Figure 1 is a sectional view of a rimless glass lens showing the inner and outer brackets with a temple fastened pivotally to the bracket.

Figure 2 is an end view of Figure 1, showing the outer bracket and the way in which it is attached to the lens.

Figure 3 is an exaggerated view of the bracket.

Figure 4 is an end view of the inner bracket.

Both brackets, per se at the time of stamping and manufacture, are the same in construction, and this construction is shown in Figure 3, wherein the brackets are designated by the numeral 5. It is of general U-shaped configuration to form a spring clip, whose outer flat spaced arms 6 engage over the outer convex surface of the lens 7. The inner parallel arm 8 is formed with a terminal enlargement or knob 9, which may be designated as a detent designed to snap into a depression 10, which is formed in the marginal portion of the lens.

The numeral 11 designates a laterally offset spring provided with the desired resilient clamping action for the jaw. The bight portion 12 is formed with an abutment 13, which engages the edge of the lens and which serves to accommodate the added fixture. In adapting the bracket 5 for use for connecting the temple 14, I provide a coupling 15, fastened to the abutment 13, and which serves to accommodate the laterally directed front end of the temple as shown in Figure 1. In the arrangement shown at the left of the lens of Figure 1, the same bracket is used, though this one is provided with a fixture of open loop form and at 15 has the shank 17 fastened to the abutment 13. Inasmuch as the brackets are generic, the same reference characters are employed, the only distinction being in the part 15 of the one bracket and the parts 16 and 17 of the other bracket. The latter bracket is obviously designed to permit connection of the nose piece (not shown) thereto, and as seen in Figure 4, this loop 15 is formed with an aperture 18 to facilitate attachment of the bridge piece and guard.

These clips are formed of a suitable metallic composition susceptible of maintaining the desired inherent resiliency for practical maintenance on the glass lens and to produce the requisite leverage to accommodate both the nose bridge and temples as the case may be.

The bead-like detent 9 functions as a cam to aid in slipping over the marginal edge of the lens and thereafter snaps into the recess or depression in the lens for holding the bracket in place and at the same time provides a sort of a pivot, so as to allow the angularity of the bracket to be properly adjusted for suitable regulation of the temples and bridge or nose pieces. Hence, an important factor of the arrangement is the detachable, adjustable arrangement of the brackets, as well as the fact that the lens is not drilled through but merely is provided with a pair of opposite depressions forming suitable keeper seats for the retaining detents 9. The bracket can be easily slipped over the marginal edge of the lens and brought into operative position, and can be just as easily separated. There are no screws or instruments necessary in this assembling or disassembling. The arrangement is neat in appearance and by a simple process of attachment or detachment eliminates breakage of the lens. It is of appropriate tensile strength to facilitate adjustment and maintenance on lenses of various thicknesses. It can be used in conjunction with any style of rimless mounting. It is economical, simple and otherwise filling the requirements of a structure of this class.

Even though I have shown and described the preferred embodiment of my invention, it is to be understood that various changes in the size, shape and arrangement of parts may be resorted to, without departing from the spirit of the invention or the scope of the appended claim.

What is claimed is:

As a new product of manufacture, a lens bracket of the class described comprising a single length of metal bent upon itself into substantially U-shaped configuration to provide a bight portion and a pair of spaced parallel jaw forming arms, one arm terminating in a knob like retaining detent, the bight portion being formed with lateral abutments to engage the edge of the lens, the bight portion and said knob equipped jaw being bent into a U-shaped loop to form a lateral contraction spring to afford the desired resilient retention properties.

In testimony whereof I affix my signature.

WINFIELD S. HANCOCK.